United States Patent [19]

Bankert et al.

[11] 4,407,994
[45] Oct. 4, 1983

[54] AQUEOUS SIZING COMPOSITION COMPRISING KETENE DIMER AND EPIHALOHYDRIN/POLYAMINO POLYAMIDE/BIS(HEXAMETHYLENE)-TRIAMINE REACTION PRODUCT

[75] Inventors: Ralph A. Bankert, New Castle; David H. Dumas, Wilmington, both of Del.

[73] Assignee: Hercules Incorporated, Wilmington, Del.

[21] Appl. No.: 279,914

[22] Filed: Jul. 2, 1981

[51] Int. Cl.$^3$ .................... C08L 77/06; C08G 69/48
[52] U.S. Cl. .................................. 524/107; 162/158; 524/253; 524/358; 524/359; 524/360; 524/364; 524/606; 524/608; 525/430; 525/435; 528/342
[58] Field of Search ............... 524/107, 360, 364, 253, 524/358, 356, 606, 608, 359, 360

[56] References Cited

U.S. PATENT DOCUMENTS

| | | | |
|---|---|---|---|
| 3,891,589 | 6/1975 | Ray-Chaudhuri | 524/608 |
| 3,988,280 | 10/1976 | Aldrich et al. | 524/608 |
| 4,240,935 | 12/1980 | Dumas | 260/9 |
| 4,243,481 | 1/1981 | Dumas | 162/158 |

OTHER PUBLICATIONS

Noller–Chemistry of Organic Compounds, 1957, Second Edition, p. 762.

*Primary Examiner*—Harold D. Anderson

[57] ABSTRACT

Disclosed is a method for sizing paper wherein the sizing agent employed is a hydrophobic cellulose reactive sizing agent such as a ketene dimer sizing agent. There is employed in combination with the sizing agent a novel sizing accelerator. Disclosed also is a novel sizing composition comprised of the sizing agent and the accelerator, the accelerator being a water-soluble nitrogen-containing reaction product of (1) a water-soluble polyaminopolyamide, such as that derived by reaction of adipic acid and diethylene-triamine; (2) an epihalohydrin, such as epichlorohydrin; and (3) a composition comprising, by weight, from about 20% to about 65% bis(hexamethylene)triamine, said composition being the residue obtained after recovery of hexamethylenediamine from its manufacture by hydrogenation of adiponitrile.

2 Claims, No Drawings

AQUEOUS SIZING COMPOSITION COMPRISING KETENE DIMER AND EPIHALOHYDRIN/POLYAMINO POLYAMIDE/BIS(HEXAMETHYLENE)TRIAMINE REACTION PRODUCT

This invention relates to the production of sized paper and sized paperboard and to compositions for use therein.

In particular, this invention relates to the manufacture of sized paper and sized paperboard wherein the sizing agent employed is a hydrophobic cellulose reactive sizing agent such as a ketene dimer sizing agent and there is employed in combination therewith a new sizing accelerator to provide substantially higher off-the-machine sizing than when the cellulose reactive sizing agent is used alone.

U.S. Pat. No. 3,840,486 discloses water-soluble, thermosettable resinous compositions derived by reaction of dicyandiamide, an ammonium salt, formaldehyde and an acid salt of a water-soluble aminopolyamide such as the water-soluble aminopolyamide derived by reaction of adipic acid and diethylenetriamine. The resinous compositions of U.S. Pat. No. 3,840,486 accelerate the sizing imparted to paper by cellulose reactive sizing agents such as ketene dimers, acid anhydrides and isocyanates. By employing the resinous compositions of U.S. Pat. No. 3,840,486 in combination with the above sizing agents for paper, higher off-the-machine sizing is provided than when using equivalent amounts of the sizing agent alone.

United Kingdom patent specification No. 1,373,788 discloses the use of dicyandiamide-formaldehyde condensates as sizing accelerators for ketene dimer sizing agents.

New Zealand Pat. No. 183,271, issued May 9, 1979, discloses the use of poly(diallylamine)-epichlorohydrin resins as sizing accelerators for hydrophobic cellulose reactive sizing agents such as ketene dimers, acid anhydrides, and organic isocyanates.

New Zealand Pat. No. 183,359, issued Mar. 19, 1979, discloses the use of nitrogen-containing condensation products obtained by reacting an epihalohydrin, such as epichlorohydrin, with a condensate derived by condensing dicyandiamide or cyanamide with polyalkylene polyamine, such as diethylenetriamine. Nitrogen-containing condensation products of this type are disclosed and described in U.S. Pat. No. 3,403,113.

U.S. Pat. No. 3,409,500 discloses a process for the manufacture of sized paper which comprises separately adding an aqueous anionic dispersion of hydrophobic organic cellulose-reactive paper sizing carboxylic anhydride particles to an aqueous suspension of cellulose papermaking fibers and a water-soluble cellulose-substantive cationic polyamine having a molecular weight in excess of 1,000, the amount of said polyamine being at least sufficient to deposit said anhydride particles on said fibers and to accelerate the rate at which said anhydride develops its sizing properties on cellulose fibers at 190° F.–250° F., sheeting said suspension to form a water-laid web, and drying said web at a temperature between 190° F. and 250° F.

In U.S. Pat. No. 3,409,500, at column 3, lines 61–70, it is stated that among the most efficient cationic polymers are the adipic acid-polyalkylenepolyamine-epichlorohydrin polymers, prepared by condensing adipic acid with a polyalkylenepolyamine thereby forming a polyamidepolyamine, and reacting this polymer with epichlorohydrin. Methods for the preparation of agents of this type are disclosed in U.S. Pat. Nos. 2,926,116, 2,926,154 and 3,329,657.

The cationic polymers of U.S. Pat. Nos. 2,926,116 and 2,926,154 are disclosed in U.S. Pat. No. 3,483,077 as being useful retention aids for ketene dimer sizing agents whereby sizing is improved as compared to cationic starch retention aid.

U.S. Pat. No. 3,575,796 discloses a method for the sizing of paper and paperboard products which comprises intimately dispersing, within the aqueous pulp slurry, or applying to a prepared paper web, an aqueous emulsion of an N-substituted aziridine compound which is prepared by means of the reaction between a carbonyl substituted, alpha, beta-ethylenically unsaturated compound such as distearyl maleate and an alkyleneimine such as ethyleneimine. The sizing agent can be uniformly dispersed with a cationic emulsifier, such as a cationic starch, for better retention on the fibers. Column 4, lines 1–44, of U.S. Pat. No. 3,575,796 discloses other cationic agents for use in aiding in the retention of the sizing agents of the invention among which are cationic thermosetting resins such as the reaction products of dibasic acids, polyalkylenepolyamines and epihalohydrins. It is stated also at column 4, lines 45–62, that the cationic agents are also useful as emulsifiers for the sizing agent.

U.S. Pat. No. 3,666,512 discloses compositions comprising hydrophobic cellulose-reactive paper-sizing carboxylic acid anhydrides and a catalyst which accelerates the rate at which the anhydride develops its sizing properties when deposited on cellulose from aqueous medium and heated. The catalyst or promoter for the anhydride size is a water-soluble cationic salt of a cellulose-substantive water-soluble polyamine. Suitable cationic agents are set forth in the table in column 7 of the patent. Among the cationic agents is an aminopolyamide-epichlorohydrin resin, the aminopolyamide being derived from diethylenetriamine and adipic acid.

Canadian Pat. No. 873,777 discloses a method for improving the wet strength, dry strength and resistance to penetration by liquids of unsized paper comprising imbibing the paper with an amine oxide capable of swelling the paper fibers and a ketene dimer paper sizing agent, heating the paper to swell the paper fibers and removing the amine oxide from the paper.

U.S. Pat. No. 3,046,186 relates to the manufacture of sized paper by the beater-addition process wherein an aqueous cationic dispersion of a hydrophobic ketene dimer is added to an aqueous suspension of cellulosic fibers. The sized paper is manufactured by forming an aqueous suspension of cellulose papermaking fibers and adding thereto an emulsion of a hydrophobic ketene dimer in an aqueous medium containing a cationic dispersing agent which may be a monomeric or high molecular weight hydrophilic or water-soluble basic nitrogenous surface-active agent. The dispersing agents are set forth in columns 3 and 4 of U.S. Pat. No. 3,046,186.

U.S. Pat. No. 3,006,806 discloses the conjoint use of an organic cationic polymer with a ketene dimer in the sizing of paper. Cationic polymers disclosed are melamine-formaldehyde resins (as described in U.S. Pat. No. 2,345,543 to Wohnsiedler and Thomas, and U.S. Pat. No. 2,559,220 to Maxwell and Lanes); ureaformaldehyde resins (as described in U.S. Pat. No. 2,657,132 to Daniel, Landes and Suen); cationic corn starch; guanidine-formaldehyde resins as described in U.S. Pat. No. 2,745,744 to Weidner and Dunlap); alkylenepolyamine-halohydrin resins (as described in U.S. Pat. No. 2,601,597 to Daniel, Wilson and Landes); and cationic ureaformaldehyde resins (as described in British Pat. Nos. 675,477 and 677,184).

U.S. Pat. No 3,084,092 relates to paper manufactured by the conjoint use of an amino resin and a hydrophobic organic isocyanate. Amino resins described in U.S. Pat. No. 3,084,092 are polyfunctional halohydrin resins of Daniel et al., U.S. Pat. No. 2,595,934; the dicyandiamide-formaldehyde-amine polymers of Dudley et al, U.S. Pat. No. 2,596,014; the ureamonosubstituted urea resins of Schiller et al., U.S. Pat. No. 2,698,787; the polyamine-polyamide linear polymers of House et al., U.S. Pat. No. 2,729,560; the polymers formed by copolymerizing acrylamide and acrylic acid in 9:1 molar ratio; the sulfonated dimethylolurea resins of U.S. Pat. No. 2,582,840; and the aminosulfuric acid-melamine-formaldehyde resins of U.S. Pat. No. 2,688,607.

In accordance with this invention, there are provided new sizing accelerators for use with hydrophobic cellulose reactive sizing agents such as ketene dimers.

The sizing accelerators used in this invention are water-soluble nitrogen-containing reaction products derived by reaction of (1) at least one water-soluble polyamino-polyamide, hereinafter sometimes referred to as "basic component (1)"; (2) an epihalohydrin, such as epichlorohydrin and epibromohydrin; and (3) a composition comprising, by weight, from about 20% to about 65% bis(hexamethylene)triamine, said composition being the residue obtained after recovery of hexamethylenediamine from its manufacture by hydrogenation of adiponitrile, hereinafter sometimes referred to as "basic component (2)."

Hexamethylenediamine is used in the manufacture of nylon. It is prepared by hydrogenation of adiponitrile by methods well known in the art. Some oligomers of hexamethylenediamine, mainly, bis(hexamethylene)triamine, are also produced during the manufacturing process which remain in the residue after recovery, as by fractional distillation, of the hexamethylenediamine. Other components usually present in the residue include residual hexamethylenediamine, higher molecular weight amines, nitriles, and lactams. Residues of the process of hexamethylenediamine manufacture are commercially available. Those containing, by weight, from about 20% to about 65% of bis(hexamethylene)-triamine can be used in this invention.

The proportions between basic component (2) and basic component (1) can vary within wide limits. In general, the preferred reaction products are those in which basic component (2) and basic component (1) are used in proportions of from about 2 to 10 parts by weight of basic component (2) for each part by weight of basic component (1). The preferred reaction products are those which have been prepared with the use of about 0.5 mole to about 1.5 moles, particularly about 0.8 mole to 1.4 moles epihalohydrin, for each basic amino group in basic component (1) and basic component (2).

The water-soluble polyaminopolyamide, basic component (1), used in this invention is derived by reaction of a dicarboxylic acid and a polyalkylenepolyamine in a mole ratio of polyalkylenepolyamine to dicarboxylic acid of from about 0.8:1 to about 1.4:1.

Particularly suitable dicarboxylic acids are diglycolic acid and saturated aliphatic dicarboxylic acids containing from 4 through 10 carbon atoms such as succinic acid, glutaric acid, adipic acid, pimelic acid, suberic acid, azelaic acid, and sebacic acid.

Other suitable dicarboxylic acids include terephthalic acid, isophthalic acid, phthalic acid, maleic acid, fumaric acid, itaconic acid, glutaconic acid, citraconic acid, and mesaconic acid.

The available anhydrides of the above acids can be used in preparing the water-soluble aminopolyamide as well as the esters of the acids. Mixture of two or more dicarboxylic acids, their anhydrides, and their esters can be used to prepare the water-soluble aminopolyamides, if desired.

A number of polyalkylene polyamines, including polyethylene polyamines, polypropylene polyamines, polybutylene polyamines and the like can be employed. Polyalkylene polyamines can be represented as polyamines in which the nitrogen atoms are linked together by groups of the formula $-C_nH_{2n}-$ where n is a small integer greater than unity, and the number of such groups in the molecule ranges from two up to about eight. Polyamines such as diethylenetriamine, triethylenetetramine, tetraethylenepentamine, and dipropylenetriamine, which can be obtained in reasonably pure form are suitable for preparing water-soluble aminopolyamides. Other polyalkylene polyamines that can be used include methyl bis(3-aminopropyl) amine and methyl bis (2-aminoethyl)amine. Mixtures of polyalkylene polyamines can be used, if desired.

The spacing of an amino group on the aminopolyamide can be increased if desired. This can be accomplished by substituting a diamine such as ethylenediamine, propylenediamine, hexamethylenediamine and the like for a portion of the polyalkylene polyamine. For this purpose, up to about 80% of the polyalkylene polyamine can be replaced by a molecularly equivalent amount of diamine. Usually, a replacement of about 50% or less will be adequate.

Temperatures employed for carrying out reaction between the dicarboxylic acid and the polyalkylene polyamine can vary from about 110° C. to about 250° C. or higher at atmospheric pressure. For most purposes temperatures between about 160° C. and 210° C. are preferred. The time of reaction will usually vary from about ½ hour to 2 hours. Reaction time varies inversely with reaction temperatures employed.

In carrying out the reaction, it is preferred to use an amount of dicarboxylic acid sufficient to react substantially completely with the primary amine groups of the polyalkylene polyamine but insufficient to react with the secondary amine groups and/or tertiary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 can be used.

The following example is illustrative of the preparation of a water-soluble polyaminopolyamide resin that can be used in this invention. In all the examples set forth in the disclosure, all parts and percentages are by weight unless otherwise specified.

EXAMPLE A

Diethylenetriamine, 100 grams, was placed in a reaction vessel equipped with a mechanical stirrer, thermometer and condenser. To this was added 146 grams of adipic acid. After the adipic acid had dissolved in the diethylenetriamine, the resulting solution was heated to about 170°–175° C. and maintained at this temperature until there was provided a reaction mass having an intrinsic viscosity of about 0.14 measured by using a 2% solution in 1 N NH₄Cl. The reaction mass was diluted with water to a solids content of about 50.6%.

In the reaction of basic components (1) and (2) with epihalohydrin, the components can be reacted in any sequence. In the preferred method, neutral or alkaline aqueous solutions containing about 30-65 percent by weight of mixtures which consist of epichlorohydrin, basic component (1), and basic component (2) are stirred at a temperature between about 25° C. and about 95° C., preferably between about 40° C. and about 70° C., until a sample of the reaction mixture has a Gardner-Holdt viscosity of at least H, preferably J-T. To stabilize the reaction products, which are self-crosslinking, it is preferred to add an amount of hydrochloric acid, sulfuric acid or acetic acid to the aqueous solution thereof such that the pH thereof is maintained between 2 and 5, preferably between 2 and 3, and to adjust the solids content of the reaction product solution to about 10-30 percent by weight by diluting with water.

The reaction can also be carried out in such a manner, that one of the two basic components is precondensed with epihalohydrin and the precondensate thus obtained is reacted in a second stage with the other basic component with or without the addition of additional epihalohydrin.

The following examples are illustrative of the preparation of the accelerators used in this invention.

EXAMPLE 1

The apparatus employed in this example comprised a 500 ml., 4-necked round bottom flask equipped with a mechanical stirrer, pH electrodes, a y-adapter containing a thermometer and condenser and a glass stopper. To the flask were added 70 grams of epichlorohydrin, 9.9 grams of the polyaminopolyamide solution prepared in accordance with Example A and 93 ml. water. 50 grams of a commercially available composition obtained as a residue from the manufacture of hexamethylenediamine by hydrogenation of adiponitrile containing about 29.8% bis(hexamethylene)triamine (the remainder being comprised mostly of higher molecular weight amines, nitriles, lactams, and hexamethylenediamine) was added, dropwise, over a period of 30 minutes to the stirred contents of the flask. The temperature of the reaction mixture was maintained at a maximum of 70° C. during the addition using an ice bath.

The reaction was exothermic and after the exotherm had subsided, heating (at 70° C.) was continued until the Gardner-Holdt viscosity of the aqueous solution of the resinous reaction product reached a value of N. The solution was diluted with 400 ml. of water and cooled to room temperature (about 23° C.). 98% sulfuric acid was added to the solution in an amount sufficient to attain and maintain a solution pH of 2. The resulting solution of the water-soluble resinous reaction product had a Brookfield viscosity of 8.3 centipoises at 25° C. using No. 1 spindle with guard at 60 r.p.m., a Gardner-Holdt viscosity of A-3⁻ and had a solids content of 16.7%.

EXAMPLE 2

Example 1 was repeated using 24.7 grams of the polyamino-polyamide solution prepared in accordance with Example A instead of 9.9 grams (as in Example 1) and 92 ml. of water instead of 93 ml. of water (as in Example 1). When the Gardner-Holdt viscosity of the aqueous solution of the resinous reaction product reached a value of O, 425 ml. of water was added and the mixture cooled to room temperature. As in Example 1, pH of the solution was adjusted to 2.0 with 98% sulfuric acid. The resulting solution of the water-soluble resinous reaction product had a Brookfield viscosity of 10.8 centipoises at 25° C. using a No. 1 spindle with guard at 60 r.p.m., a Gardner-Holdt viscosity of A-3⁻ and had a solids content of 18.7%.

EXAMPLE 3

The apparatus used in this example was that used in Example 1. To the flask were added 60 grams of epichlorohydrin and 92 ml. of water. 50 grams of the commercially available composition containing about 29.8% bis(hexamethylene)triamine as used in Example 1 was added, dropwise, over a period of 31 minutes to the stirred contents of the flask. The temperature of the reaction mixture was maintained at a maximum of 70° C. during the addition using an ice bath. The reaction was exothermic and after the exotherm had subsided, heating (at 70° C.) was continued until the Gardner-Holdt viscosity of the aqueous solution of the resinous reaction product reached J. Then, 10 grams epichlorohydrin, 24.7 grams of the polyaminopolyamide solution prepared in accordance with Example A and 5 ml. of water were added to the contents of the flask and heating at 70° C. continued. When the solution reached a Gardner-Holdt viscosity value of O, 425 ml. of water was added and the solution cooled to room temperature. As in Example 1, sulfuric acid (98%) was added to give a pH of 2.0. The resulting solution of the water-soluble resinous reaction product had a Brookfield viscosity of 13.3 centipoises at 25° C., using a No. 1 spindle with guard at 60 r.p.m., a Gardner-Holdt viscosity A-3⁺ and a solids content of 17.2%.

EXAMPLE 4

The apparatus used in this example was that used in Example 1. To the flask were added 60 grams of epichlorohydrin and 86 ml. of water. 50 grams of the commercially available composition containing about 29.8% bis(hexamethylene)triamine as used in Example 1 was added, dropwise, over a period of 30 minutes to the stirred contents of the flask. The temperature of the reaction mixture was maintained at a maximum of 70° C. during the addition using an ice bath. The reaction was exothermic and after the exotherm had subsided, heating at 70° C. was continued until the Gardner-Holdt viscosity of the aqueous solution of the resinous reaction product reached a value of K. Then, 13.5 grams of epichlorohydrin, 37.2 grams of the polyaminopolyamide solution prepared in accordance with Example A and 89 ml. of water were added to the contents of the flask and heating at 70° C. continued. When the solution reached a Gardner-Holdt viscosity of G⁺, 466 ml. of water was added and the reaction mass cooled to room temperature. As in Example 1, sufficient sulfuric acid (98%) was added to give a pH 2.0. The resulting solution of the water-soluble resinous reaction product had a Brookfield viscosity of 19.1 centipoises at 25° C., using a No. 1 spindle with guard at 60 r.p.m., a Gardner-Holdt viscosity A-1⁻ and a solids content of 17.7%.

EXAMPLE 5

The apparatus used in this example was that used in Example 1. To the flask were added 60 grams of epichlorohydrin and 86 ml. of water. 50 grams of the commercially available composition containing about 29.8% bis(hexamethylene)triamine as used in Example 1 was added, dropwise, over a period of 30 minutes to the stirred contents of the flask. The temperature of the reaction mixture was maintained at a maximum of 70° C. during the addition using an ice bath. The reaction was exothermic and after the exotherm had subsided, heating at 70° C. was continued until the Gardner-Holdt viscosity of the aqueous solution of the resinous reaction product reached a value of K. Then, 13.5 grams of epichlorohydrin, 49.4 grams of the polyaminopolyamide solution prepared in accordance with Example A and 99 ml. of water were added to the contents of the flask and heating at 70° C. continued. At a Gardner-Holdt viscosity value of G/H, 384 ml. of water was added and the mixture cooled to room temperature. Sufficient sulfuric acid (98%) was added to give a pH 2.0. The resulting aqueous solution of the water-soluble resinous reaction product had a Brookfield viscosity of 21.5 centipoises at 25° C. using a No. 1 spindle with guard at 60 r.p.m., a Gardner-Holdt viscosity A-1 and a solids content of 17.6%.

Ketene dimers used as cellulose reactive sizing agents are well known in the art and are dimers having the formula:

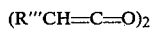

where $R'''$ is a hydrocarbon radical, such as alkyl having at least 8 carbon atoms, cycloalkyl having at least 6 carbon atoms, aryl, aralkyl and alkaryl. In naming ketene dimers, the radical $R'''$ is named followed by "ketene dimer." Thus, phenyl ketene dimer is:

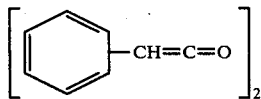

benzyl ketene dimer:

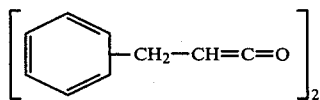

and decyl ketene dimer is $(C_{10}H_{21}\text{-}CH=C=O)_2$. Examples of ketene dimers include octyl, decyl, dodecyl, tetradecyl, hexadecyl, octadecyl, eicosyl, docosyl, tetracosyl, phenyl, benzyl, beta-naphthyl and cyclohexyl ketene dimers, as well as the ketene dimers prepared from montanic acid, naphthenic acid, $\Delta^{9,10}$-decylenic acid, $\Delta^{9,10}$-dodecylenic acid, palmitoleic acid, oleic acid, ricinoleic acid, linoleic acid, linolenic acid, and eleostearic acid, as well as ketene dimers prepared from naturally occurring mixtures of fatty acids, such as those mixtures found in coconut oil, babassu oil, palm kernel oil, palm oil, olive oil, peanut oil, rape oil, beef tallow, lard (leaf) and tall oil. Mixtures of any of the above-named fatty acids with each other may also be used.

EXAMPLE B

An emulsion of a ketene dimer prepared from a mixture of palmitic and stearic acids was prepared by admixing 880 parts of water, 60 parts of cationic corn starch and 10 parts of sodium lignin sulfonate. The mixture was adjusted to pH of about 3.5 with 98% sulfuric acid. The resulting mixture was heated at 90°-95° C. for about one hour. Water was then added to the mixture in an amount sufficient to provide a mixture of 1750 parts (total weight). About 240 parts of the ketene dimer was stirred into the mixture together with 2.4 parts of thiadiazine. Thiadiazine is used as a preservative. The resulting premix (at 65° C.) was homogenized in one pass through an homogenizer at 4000 p.s.i. The homogenized product is diluted with water to a ketene dimer solids content of about 6%.

As is well known in the art, hydrophobic cellulose reactive sizing agents are used in the internal sizing of paper and in the external sizing of paper. The accelerators of this invention can be used in combination with the sizing agent in either method.

EXAMPLE 6

The products of Example 1 and Example B were combined with addition of water, as required, to provide an aqueous sizing composition comprised of 0.10% ketene dimer and 0.15% of the nitrogen-containing resinous reaction product of Example 1.

EXAMPLE 7

The products of Example 2 and Example B were combined with addition of water, as required, to provide an aqueous sizing composition comprised of 0.10% ketene dimer and 0.15% of the nitrogen-containing resinous reaction product of Example 2.

EXAMPLE 8

The products of Example 3 and Example B were combined with addition of water, as required, to provide an aqueous sizing composition of 0.10% ketene dimer and 0.15% of the nitrogen-containing resinous reaction product of Example 3.

EXAMPLE 9

The products of Example 4 and Example B were combined with addition of water, as required, to provide an aqueous sizing composition comprised of 0.10% ketene dimer and 0.15% of the nitrogen-containing resinous reaction product of Example 4.

EXAMPLE 10

The products of Example 5 and Example B were combined with addition of water, as required, to provide an aqueous sizing composition comprised of 0.10% ketene dimer and 0.15% of the nitrogen-containing resinous reaction product of Example 5.

EXAMPLE 11

An aqueous sizing composition was prepared to provide a sizing composition as in Examples 6, 7, 8, 9, and 10 with the exception that, as a control, there was employed a resin derived by reaction of epichlorohydrin with 1:1 mole reaction product of dicyandiamide and diethylenetriamine, the amount of epichlorohydrin used being 1.2 moles per mole of secondary nitrogen of the reaction product. The use of this nitrogen-containing resin as an accelerator for ketene dimers is disclosed in New Zealand Pat. No. 183,359.

EXAMPLE C

Each of the above sizing compositions was evaluated in 40 lb./3000 ft.$^2$ handsheets that were made from a blend of 30% hardwood kraft, 30% softwood kraft, and 40% unprinted newsblank pulp (groundwood pulp). The kraft plugs were beaten to 500 C.S.F. and were then blended into the groundwood pulp which had been dispersed but not refined. The handsheets were made on a Noble and Wood handsheet machine using water with 10 p.p.m. of hardness and 150 p.p.m. alkalinity. The sheets were wet pressed to 33% solids (67% moisture) and then drum dried for 50 seconds at 240° F. to about 4% moisture. The compositions were added to aliquots of pulp slurry prior to addition to the sheet mold. Sizing was measured by the Hercules Size Test with test solution No. 2 to the indicated reflectance. Test results are shown in Table I below. Five separate hand-sheets were made from each sizing composition-pulp combination. The values are the average of a single test made on each of the five sheets.

TABLE I

| Sizing Composition of Example | Hercules Sizing Test Seconds to 80% Reflectance Test Ink No. 2 | |
| --- | --- | --- |
| | Natural Aging 1 Day | Cured 5 min. at 105° C.* |
| 1 | 332 | 1130 |
| 7 | 279 | 868 |
| 8 | 250 | 824 |
| 9 | 193 | 736 |
| 10 | 260 | 732 |
| 11 (control) | 169 | 396 |

*Curing at 105° C. for 5 minutes is an accelerated test used by the art and the results obtained are representative of the size properties of paper after about one week of natural aging.

EXAMPLE 12

The apparatus used in this example was the same as that used in Example 1. To the flask were added 85 grams of epichlorohydrin, 9.9 grams of the polyaminopolyamide solution of Example A and 85 ml. of water. 50 grams of a commercially available amine composition obtained as a residue from the manufacture of hexamethylenediamine by hydrogenation of adiponitrile containing about 54.2% bis(hexamethylene)triamine diluted with 50 ml. of water was added, dropwise, over a period of 30 minutes to the stirred contents of the flask. The amine composition contained, in addition to the bis(hexamethylene)triamine, higher molecular weight amines, nitriles, lactams, and hexamethylenediamine. The temperature of the reaction mixture was maintained at a maximum of 60° C. during the addition using an ice bath. The reaction was exothermic and after the exotherm had subsided, the mixture was heated at 70° C. until the Gardner-Holdt viscosity of the aqueous solution of the resinous reaction product mass reached a value of M. The solution was diluted with 555 ml. of water and cooled to 25° C. As in Example 1, the pH of the solution was adjusted to 2.0 with 98% sulfuric acid. The resulting solution had a Brookfield viscosity of 7.8 centipoises at 25° C. using a No. 1 spindle with guard at 60 r.p.m. and had a solids content of 19.8%.

EXAMPLE 13

The apparatus used in this example was the same as that used in Example 1. To the flask were added 80 grams of epichlorohydrin and 52 ml. of water. 50 grams of an amine composition as used in Example 12, diluted with 50 ml. of water, was added, dropwise, over a period of 30 minutes to the stirred contents of the flask. The temperature of the reaction mixture was maintained at a maximum of 60° C. during the addition using an ice bath. The reaction was exothermic and after the exotherm had subsided, the mixture was heated at 70° C. until the Gardner-Holdt viscosity of the reaction mass reached a value of K. Then, 10 grams of epichlorohydrin, 24.7 grams of the polyaminopolyamide solution prepared in accordance with Example A and 114 ml. of water were added to the contents of the flask and heating at 70° C. continued. When the solution reached a Gardner-Holdt viscosity value of H−, 381 ml. of water was added and the reaction mass cooled to 25° C. Sufficient 98% sulfuric acid was added to obtain and maintain a pH of 2.0. The resulting solution of the water-soluble resinous reaction product had a Brookfield viscosity of 55.5 centipoises at 25° C. using a No. 1 spindle with guard at 60 r.p.m. and a solids content of 18.5%.

EXAMPLE 14

The apparatus used in this example was the same as that used in Example 1. To the flask were added to 80 grams of epichlorohydrin and 52 ml. of water. 50 grams of the amine composition as used in Example 12, diluted with 50 ml. of water, was added, dropwise, over a period of 29 minutes to the stirred contents of the flask. The temperature of the reaction mixture was maintained at a maximum of 60° C. during the addition using an ice bath. The reaction was exothermic and after the exotherm had subsided, the mixture was heated at 70° C. until the Gardner-Holdt viscosity of the reaction mass reached a value of K−. Then, 13.5 grams of epichlorohydrin, 49.4 grams of a polyaminopolyamide solution prepared in accordance with Example A and 126 ml. of water were added to the contents of the flask and heating at 70° C. continued. When the solution reached a Gardner-Holdt viscosity value of H+, 421 ml. of water was added and the reaction mass cooled to 25° C. Sufficient 98% sulfuric acid was added to obtain and maintain a pH of 2.0. The resulting solution of the water-soluble resinous reaction product had a Brookfield viscosity of 29.3 centipoises at 25° C. using a No. 1 spindle with guard at 60 r.p.m. and a solids content of 19.3%.

EXAMPLE 15

The apparatus used in this example was the same as that used in Example 1. To the flask were added 100 grams of epichlorohydrin, 9.9 grams of the polyaminopolyamide solution of Example A and 100 ml. of water. 50 grams of an amine composition obtained as a residue from the manufacture of hexamethylenediamine by hydrogenation of adiponitrile containing about 63.3% bis(hexamethylene)triamine, higher molecular weight amines, nitriles, lactams and hexamethylenediamine, diluted with 50 ml. of water, was added, dropwise, over a period of 59 minutes to the stirred contents of the flask. The temperature of the reaction mixture was maintained at a maximum of 60° C. during the addition using an ice bath. The reaction was exothermic and after the exotherm had subsided, the mixture was heated at 80° C. During the heating period an additional 12.2 grams of the 50% aqueous solution of the above amine composition was added periodically in 1 to 2 g. portions. Heating was discontinued when the Gardner-Holdt viscosity of the reaction mass reached a value of 0+. 450 ml. of water was added and the reaction mass cooled to 25° C. Sufficient 98% sulfuric acid was added to obtain and maintain a pH of 2.0. The resulting solution of the water-soluble resinous reaction product had a Brookfield viscosity of 19.6 centipoises using a No. 1 spindle with guard at 60 r.p.m. and a solids content of 21.7%.

EXAMPLE 16

The products of Example 12 and Example B were combined with addition of water, as required, to provide an aqueous sizing composition comprised of 0.10% ketene dimer and 0.15% of the nitrogen-containing resinous reaction product of Example 12.

EXAMPLE 17

The products of Example 13 and Example B were combined with addition of water, as required, to provide an aqueous sizing composition comprised of 0.10% ketene dimer and 0.15% of the nitrogen-containing resinous reaction product of Example 13.

EXAMPLE 18

The products of Example 14 and Example B were combined with addition of water, as required, to provide an aqueous sizing composition comprised of 0.10% ketene dimer and 0.15% of the nitrogen-containing resinous reaction product of Example 14.

EXAMPLE 19

The products of Example 15 and Example B were combined with addition of water, as required, to provide an aqueous sizing composition comprised of 0.10% ketene dimer and 0.15% of the nitrogen-containing resinous reaction product of Example 15.

EXAMPLE D

Each of the sizing compositions of Examples 16, 17, 18, 19 and 11 (control) was applied to the surface of three sheets of 40 lb./3000 ft.² waterleaf paper. Each sheet was made from a 50:50 hardwood:softwood pulp blend on a pilot paper machine. Each sizing composition was adjusted to pH 7 before application to the sheet in the nip of a horizontal size press. The size press ran at 40 ft./min. and the wet pickup was 70%. Retention of the ketene dimer size was the same in all of these runs. The sized sheets were dried at 93° C. for 20 sec. on a laboratory drum drier to 5% moiture. The sizing was measured by the Hercules Size Test with test solution No. 2 to the indicated reflectance. The off-machine data were obtained within two minutes of drying and the natural aged data after 3 days storage at room temperature. It is known in the art that ketene dimer size develops substantially all its sizing properties in the paper in about 3 days. After this time the size properties of the paper remain essentially the same. The off-machine result is a critical result as it indicates the rate at which sizing develops. The surface application of the sizing compositions eliminates any retention effects of the cationic polymer used. Size results are set forth in Table II below. The test values are the average of a single test made on each of the three sheets.

TABLE II

| Sizing Composition of Example | Hercules Sizing Test Seconds to 80% Reflectance Test Ink No. 2 Surface Sizing | |
|---|---|---|
| | Off-the-Machine | Natural Aged - 3 days |
| 16 | 338 | 1309 |
| 17 | 398 | 924 |
| 18 | 442 | 980 |
| 19 | 677 | 898(a) |
| 11 (control) | 318 | 977 |

(a)4 days

When employed in combination with hydrophobic cellulose reactive sizing agents in the sizing of paper, the accelerators of this invention, in aqueous solution, can be added either separately to the paper pulp (for internal sizing) or separately to the paper sheet (for external sizing), either before or after addition of sizing agent. Alternatively, the accelerator and sizing agent can be added at the same time to the paper pulp or paper sheet as separate aqueous emulsions or as a single emulsion comprised of the two ingredients. The range of proportions of the sizing agent and accelerator can vary from 1:3 to 3:1.

The amount of accelerator incorporated into the paper sheet will be from about 0.05% to about 0.5% (preferably from about 0.05% to about 0.25%) by weight based on the dry weight of the paper.

The preferred aqueous emulsions of this invention will consist essentially of, by weight, (I) from about 3 to about 30 parts solids and (II) from about 97 to about 70 parts water, the total of (I) and (II) being 100 parts. The solids content will consist essentially of, by weight, (a) from about 1 to about 12 parts ketene dimer, (b) from about 1 to about 25 parts accelerator, and (c) from about 1 to about 25 parts of an emulsifier, the amounts of (a), (b) and (c) being selected so that the total weight thereof will be in the range 3 to 30 parts.

The term "emulsion" is used herein and in the claims, as is customary in the art, to mean either a dispersion of the liquid-in-liquid type or of the solid-in-liquid type.

The above description and working examples are illustrative of this invention and not in limitation thereof.

What we claim and desire to protect by Letters Patent is:

1. An aqueous ketene dimer emulsion consisting essentially of, by weight, (I) from about 3 to about 30 parts solids and (II) from about 97 to about 70 parts water, the total of (I) and (II) being 100 parts, the solids (I) consisting essentially of, by weight, (a) from about 1 part to about 12 parts ketene dimer, (b) from about 1 part to about 25 parts water-soluble resinous reaction product, and (c) from about 1 part to about 25 parts of an emulsifier, the amounts of (a), (b) and (c) being selected so that the total weight thereof will be in the range of 3 to 30 parts, said component (b) being a water-soluble resinous reaction product derived by reaction of (i) an epihalohydrin, (ii) a water-soluble polyaminopolyamide resin, and (iii) a composition comprised of from about 20% to about 65% by weight of bis(hexamethylene)triamine wherein (iii) is used in an amount of from about 2 to 10 parts by weight for each part by weight of (ii) and (i) is used in an amount of from about 0.5 mole to about 1.5 moles for each basic amino group present in (ii) and (iii), said component (iii) being in the residue obtained after recovery of hexamethylenediamine from its manufacture by hydrogenation of adiponitrile and said component (ii) being derived by reaction of a dicarboxylic acid and a polyalkylenepolyamine in a mole ratio of amine to acid of from about 0.8:1 to about 1.4:1.

2. The emulsion of claim 1 wherein (i) is epichlorohydrin and (ii) is a polyaminopolyamide derived from adipic acid and diethylenetriamine.

* * * * *